United States Patent [19]

Tsuchiya et al.

[11] 4,139,948
[45] Feb. 20, 1979

[54] MICROMANIPULATOR

[75] Inventors: Haruhiko Tsuchiya, Musashino; Setsuo Sato, Yokohama; Makoto Minorikawa, Hoya, all of Japan

[73] Assignees: Nippon Telegraph and Telephone Public Corporation; Opto Micron Industry Co., Ltd., both of Tokyo, Japan

[21] Appl. No.: 839,604

[22] Filed: Oct. 5, 1977

[30] Foreign Application Priority Data

Oct. 5, 1976 [JP] Japan .............................. 51-119649

[51] Int. Cl.$^2$ ............................................. B23Q 17/18
[52] U.S. Cl. ............................ 33/180 R; 33/174 TA
[58] Field of Search .......... 33/180 R, 174 TA, 185 R, 33/169 R, 170, 171, 166, 1 M; 269/71

[56] References Cited

U.S. PATENT DOCUMENTS

| 3,188,078 | 6/1965 | Peterson | 33/174 TA |
| 3,829,978 | 8/1974 | Basin et al. | 33/174 TA |

*Primary Examiner*—Richard E. Aegerter
*Assistant Examiner*—Willis Little

[57] ABSTRACT

A parallelepiped housing contains a displacement-transfer plate being slidable along the surface, and a pair of micrometer heads of the same shape and same size are mounted on a rear plate of said housing headed toward the front in said housing maintaining parallel and definite distance to one another.

A differential lever is formed in such a length that the pivot parts at each tip of said pair of micrometer heads are rendered to serve as fulcrums, respectively, and a non-bisected part in the lengthwise direction of said lever is rotatably and pivotally supported as a point of application at the said displacement-transfer plate.

A rectangular slider block is so constructed as to be guided along side plates and a base plate forming said housing, and is always pulled rearwards by a resilient means. Said slider block and said displacement-transfer plate are fastened via a determined space.

Whereby coarse and fine adjustable displacements are realized at the displacement-transfer plate.

9 Claims, 6 Drawing Figures

MICROMANIPULATOR

BACKGROUND OF THE INVENTION

The present invention is concerned to a micromanipulator which performs fine adjustment of linear displacement to attain high-accuracy positioning utilizing a differential lever.

Differential levers have so far been well known in which any one of feed screws is turned by supporting both ends of a lever by means of a pair of feed screws, whereby said lever undergoes angular displacement with the point contacting to said other stationary feed screw as a fulcrum, so that the advancing length of each part of the lever is proportional to the distance from each fulcrum, and in which if the point of application is set to a position at which the axis distance of said pair of feed screws in divided to 10:1, the feed lengths of a feed screw near to the point of application and a feed screw remote from the point of application are transformed differentially at a ratio of 10 for the former and 1 for the latter as said point of application.

The first object of the present invention is to provide a micromanipulator which can attain reliable and fine adjustment, that is suited for aligning the cores of ends of optical fibers that require very fine positioning of the accuracy order of, for example, 0.1 to 0.2 microns, by utilizing the principle of the aforementioned differential lever.

The second object of the present invention is to provide a micromanipulator of a small and compact size by enclosing major portions of the mechanism in a housing to shut off the mechanism from the external atmosphere, in order to prevent the precision from being deteriorated by the infiltration of dirt and dust.

The third object of the present invention is to provide a micromanipulator which requires very easy handling operation and which can attain quick positioning, by employing micrometer heads of the same shape and same size for the two dissimilar feed mechanisms which perform coarse adjustment and fine adjustment to attain good exchangeability and balancing in appearance as well as to attain quick intertransfer change over between coarse adjustment and fine adjustment at any desired moment, and in particular, to attain quick change over from an extremely inclined position to fine adjustment even where the differential lever is extremely inclined to perform long-distance coarse displacement, thereby keeping always constant magnification and without producing any errors.

The fourth object of the present invention is to provide a micromanipulator of a small size, simple construction and cheap cost, that is capable of two dissimilar coarse and fine adjustments by way of a common and single guide mechanism.

The fifth object of the present invention is to provide a micromanipulator being capable of variable magnification between both coarse and fine displacements.

The sixth object of the present invention is to provide a micromanipulator which can attain reliable and quick positioning by providing means to prevent erroneous operation or confusion that may result from the employment of feed mechanisms of the same shape and same size for performing coarse adjustment and fine adjustment.

SUMMARY OF THE INVENTION

Summarizing the setup of the present invention, the micromanipulator comprises;

a parallelepiped housing containing a displacement-transfer plate, which also serves as a lid plate, being slidable along the surface.

a pair of micrometer heads of the same shape and same size that are mounted on a rear plate of said housing headed toward the front in said housing maintaining parallel and definite distance to one another;

a differential lever having such a length that the pivot parts at each tip of said pair of micrometer heads and rendered to serve as fulcrums, respectively, wherein a nonbisected part in the lengthwise direction of said lever being rotatably and pivotally support at the lower surface of said displacement-transfer plate;

a rectangular slider block which is so constructed as to be guided in the direction along side plates and a base plate forming said housing, and resilient means which pulls said slider block always rearwards;

connecting means by which said slider block and said displacement-transfer plate are fastened together to a single unit via a determined spacer.

In addition, means that shift relative connection between said slider block and said displacement-transfer plate to the traversal direction in order to vary magnification of both coarse and fine displacements.

DESCRIPTION OF THE PREFERRED EMBODIMENT

Figure 1:
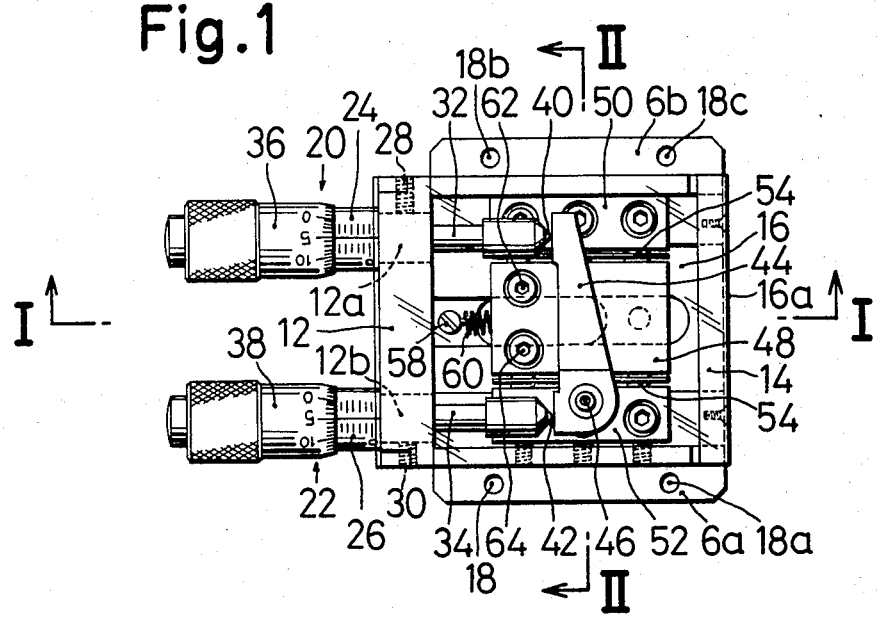
FIG. 1 is a plan view of a micromanipulator of the present invention.
Figure 2:
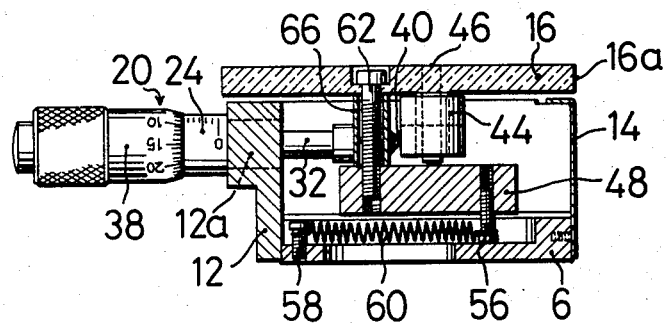
FIG. 2 is a vertical cross-sectional view of the micromanipulator of the present invention cut along the line I—I of FIG. 1.
Figure 3:
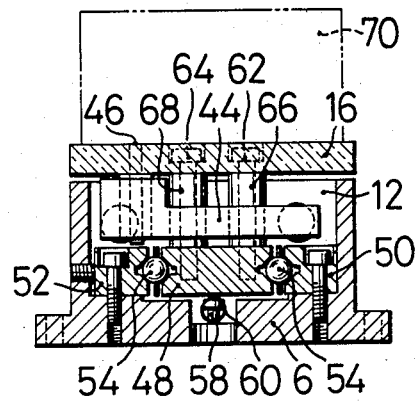
FIG. 3 is a vertical cross-sectional view of the micromanipulator of the present invention cut along the line II—II of FIG. 1.

A parallelepiped housing consists of a bottom plate 6, a pair of side plates 8 and 10, rear plate 12, front covering 14, and a displacement-transfer plate 16 that also serves as a lid plate. The bolts which are not shown are passed through holes 18, 18a, 18b and 18c formed on both side edges 6a and 6b of said bottom plate 6 to secure said housing on the surface which is not shown.

The rear plate 12 of said housing has holes 12a and 12b through which will be inserted a pair of micrometer heads 20 and 22 headed toward the inside of the housing. Outer sleeves 24 and 26 of each of the micrometer heads are fastened by way of screws 28 and 30. Being so fastened, said pair of micrometer heads 20 and 22 are maintained in parallel with one another and spindles 32 and 34 are directed toward the front in the box maintained a distance A between the axes. Thimbles 36 and 38 are then secured in a state being protruded rearward of the housing. Here, it is essential that said pair of micrometer heads 20 and 22 are quite of the same shape and of the same size as shown in FIG. 1. For this purpose, tips 40 and 42 of the spindles of commonly available micrometer heads are deformed into the shape of a pivot.

A differential lever 44 is a length so that its side surface is in sufficient contact with the pivot parts at each tip of said pair of micrometer heads to form fulcrums, respectively, and a non-bisected part 46 in the lengthwise direction of said lever 44 is rotatably and pivotally supported at the lower surface of said lid plate 16, in order that said-non-bisected part 46 will serve as a point of application.

According to an embodiment shown in the drawings, the pivotal point 46 between the differential lever 44 and the lid plate 16 is positioned at a point which divides the distance A between axes of a pair of micrometer heads 20 and 22 into 10/11 : 1/11 to get a magnification of displacement of 10:1 between coarse adjustment and fine adjustment.

A pair of side plates 8 and 10 ae protruded in parallel to the same height and same width at right angles from one side of said bottom plate 6. A rectangular slider block 48 is so constructed as to be guided in the direction along said pair of side plates and said bottom plate. As a means of guiding said slider block 48, the embodiment shown in the drawings is equipped with rectangular guide blocks 50 and 52 that are fastened by screws inside of said pair of side plates 8 and 10, and in which three sliding steel balls 54 are interposed, respectively, between each of the inner sides of said guide blocks 50 and 52 and both surfaces of said slider block 48, in order that the slider block 48 can undergo fine displacement. Also, in order to pull the slider block 48 always rearwards, a pulling spring 60 is resiliently provided between a pin 56 protruded from the front lower surface of the slide block 48 and a pin 58 protruded from the rear upper surface of said bottom plate 6.

The slider block 48 and the lid plate 16 have been connected and fastened as a single unit. As a connection and fastening means, the embodiment shown in the drawing connects them at two portions by way of bolts 62 and 64; each bolt is fitted with sleeves 66 and 68 that serve as a spacer to attain tight fastening, so that there will develop no torsion or deformation.

Figure 6:
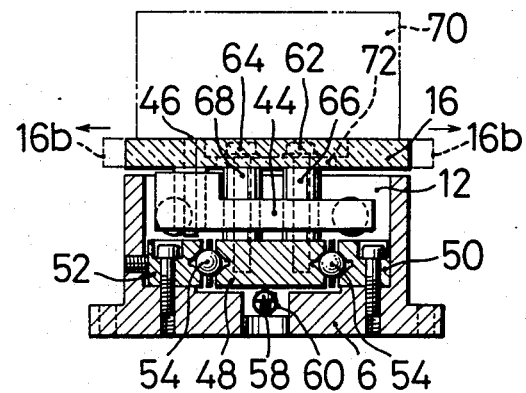
FIG. 6 is a vertical cross-sectional view cut along the line II—II of FIG. 1, similar to FIG. 3, showing an embodiment using a displacement-transfer plate of the said variable type of magnification.

The aforesaid lid plate 16 is a final displacement-transfer plate that also has a function as a convering of the housing, and, for positioning, an object body 70 in FIG. 6 is fastened on the upper surface of the plate 16, or another object body (not shown) is pushed at the front surface of the plate 16. Also, the lid plate 16 may be made of an opaque material to attain the aforementioned fundamental effects. But is the lid plate 16 is made of a transparent material as shown in the drawing, it is possible to advance the operation by frequently and visually checking whether the operation of the internal mechanism is in normal state or out of normal state ovbiating the need to dismantle it. Not only this, there is no room to mistake which one of a pair of micrometer heads 20 and 22 is for coarse adjustment and which one is for fine adjustment. This serves to avoid confusion that may result from the use of a pair of micrometer heads of quite the same shape and same size.

The aforesaid effect of visual confirmation can be more heightened if the distance A between axes of a pair of micrometer heads is described on the front surface and back surface of the lid plate 16. That is by expressing based on the lever 44, if the fulcrum positions B and C of the lever, point of application 46, and inclined position D of the differential lever 44 are described, there is no probability of mistaking the coarse adjustment for fine adjustment or vice versa, enabling to carry out the positioning operation reliably.

Figure 4:
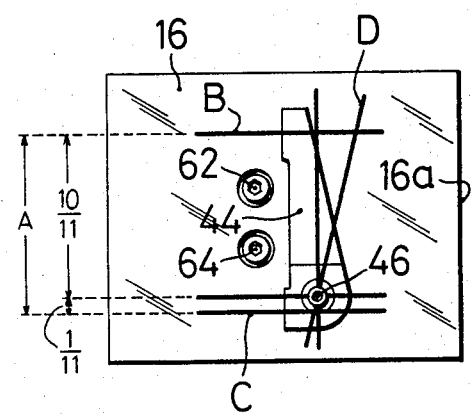
FIG. 4 is a explanatory plan view showing relationship between a displacement-transfer plate and a differential lever for use in the present invention.
Figure 5:
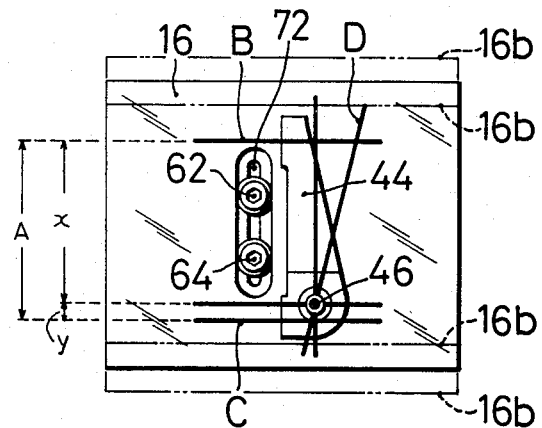
FIG. 5 is a explanatory plan view showing another embodiment modifying the said displacement-transfer plate in FIG. 4 into a variable type of magnification.

FIGS. 5 and 6 show means being variable magnification of both coarse and fine displacements in the limit that the distance A between axes of a pair of micrometer heads is constant. A pair holes being opened through the displacment-transfer plate 16 in FIG. 4 are modified in a traversal long hole 72 in Gugure 5 and 6, whereby the displacement-transfer plate 16 can fasten at the eccentric portion to the direction of left or right in the relation of the slider block 48, as shown that the differential lever 44 being connected at the lower surface of the displacement-transfer plate 16 via the point of application 46 can displace along the longitudinal direction of the lever 44. That is to transfer differentially the distance x between the point of application 46 and s line C along the axis of the micrometer head 22, and, the distance y between the point of application 46 and a line B along the axis of the micrometer head 20, in the limit of the distance A between axes of a pair of micrometer heads 20 and 22.

The function of the present invention is illustrated below.

The slider block 48 which is constructed as an integral unit by way of bolts 62, 64 and spacers 66 and 68, has been always pulled rearward by way of the pulling spring 60, so that the rear surface of the differential lever 44 is always pressed to the pivot parts 40 and 42 at the tip of a pair of micrometer heads 20 and 22.

Hence, after the front surface 16a of the lid plate 16 has been fixed to the holes 18, 18a, 18b and 18c on both side edges 6a and 6b of the bottom plate 6 by way of bolts (not shown) so that it is faced to the object (not shown) that is to be positioned, if the thimble 38 of the micrometer head 22 on the side of coarse adjustment is turned counterclockwise, the spindle part 34 of said head 22 extends forward along the line C of FIG. 4, and the pivot part 42 at the tip thereof pushes the right side of the point of application 46 of the differential lever 44, i.e., pushes a position corresponding to the distance A × (1/11) between axes of the micrometer heads.

The lever 44 then undergoes angular displacement with the pivot part 40 at the tip of another micrometer head 20 as a fulcrum, so that the point of application 46 moves forward with a displacement amount 10 times as much as that which will be gained by the other micrometer head 20.

Therefore, the lid plate 16 which is integrally connected with said point of application 46 is advanced forward accurately along the guide blocks 50 and 52 via the slider block 48 to displace the object body that is to be positioned at the upper surface of the lid plate 16.

After the displacement is roughly adjusted by way of the micrometer head 22 for rough adjustment, the operation is switched to the micrometer head 20 for fine adjustment. As the thimble 36 of said head 20 is turned counterclockwise, the spindle part 32 of said head 20 is extended forward along the line B in FIG. 4, and the pivot part 40 at the tip thereof pushes the left side of the point of application 46 of the differential lever 44, i.e., pushes a position corresponding to the distance A × (10/11) between the axes of the micrometer heads.

The differential lever 44 then undergoes angular displacement with the pivot part 42 at the tip of the micrometer head 22 as a fulcrum, so that the point of application 46 is displaced forward in small quantity, i.e., one-tenth of the displacement of the case of the micrometer head 22; the lid plate 16 formed integrally with said point of application 46 is also displaced in small quantity.

After the point of application has been displaced in small quantity, when it is desired to cause large displacement again, the operation of the micrometer head 20 for fine adjustment is stopped and switched to the operation of the micrometer head 22 for coarse adjustment. The front surface 16a of the lid plate 16 is then displaced in large quantity.

Fine positioning is materialized by appropriately repeating the operations of coarse adjustment and fine adjustment.

In the another embodiment shown by FIGS. 5 and 6 the fixed position of the bolts 62 and 64 in the slider block 48 is fastened eccentrically to the direction of left or right along the traversal long hole 72 in the relation of the displacement-transfer plate 16 so that the both distance x and y from the point of application 46 of the differential lever 44 can vary in the limit of the distance A between the axes of both micrometer heads.

Even where the amounts of extension of the pair of heads 20 and 22 are out of balance causing the differential lever 44 to be inclined extremely with the point of application 46 as a center as shown by the line D in FIG. 4, the tips 40 and 42 of both heads that are formed in the form of pivots undergo sliding to sufficiently follow the inclined positions and develop no abnormal condition. Besides, since the distance between the fulcrums of both sides with the point of application 46 as a center, always undergo extension and contraction at a definite ratio, for example, at a ratio of 10/11 to 1/11, the feeding accuracy invites no error but keeps precision.

The device of the present invention employs micrometer heads of quite the same shape and same size for both the coarse and fine feeding mechanisms, providing good exchangability and balance in appearance, and employs means of preventing erroneous operation to avoid possible confusion between the pair of the same mechanisms, thus assuring quick and reliable positioning operation. In short, the lid plate 16 forming part of the housing is made of a transparent material so that the internal mechanism can be seen through and further, the line B, C and D are described on said transparent plate 16.

Furthermore, according to the micromanipulator of the present invention, the major part of the mechanism is contained in the housing and shut off from the external atmosphere to prevent the decrease of accuracy that might be caused by the adhesion of dust and dirt on the moving parts, the lid plate 16 is made slidable in the forward and backward directions in order that said lid plate 16 will serve as a plate of transmitting final displacement, and the entire setup is made up of a single guide mechanism, thereby producing very high performance based on over-all effects of the device.

What is claimed is:

1. A micromanipulator comrising:
    a parallelepiped housing containing side plates, a displacement-transfer plate, which also serves as a lid plate,;
    a pair of micrometer heads of the same shape and same size that are mounted on a rear plate of said housing headed toward the front in said housing maintaining parallel and definite distance to one another and each having pivot parts mounted at the top thereof;
    a differential lever formed in such a length that the pivot parts serve as fulcrums, respectively, wherein a non-bisected part in the lengthwise direction of said lever being rotatably and pivotally supported as a point of application at the lower surface of said displacement-transfer plate such that rotational movement of said heads produces axial movement of said displacement transfer plate;
    a rectangular slider block which is so constructed as to be guided in the direction along side plates and a base plate forming said housing with said lid plate slideable along the surface of said slider block;
    resilient means which pulls said slider block always rearwards; and
    connecting means by which said slider block and said displacement-transfer plate are fastened together to a single unit via a predetermined spacer.

2. A micromanipulator according to claim 1, including means that shift relative connection between the slider block and the displacement-transfer plate to the traversal direction in order to vary degree of both coarse and fine displacement.

3. A micromanipulator according to claim 1, wherein said parallelpiped housing includes a bottom plate, a pair of side plates, a rear plate and a front covering.

4. A micromanipulator according to claim 1, wherein said pair of micrometer heads are so mounted on the rear plate that the thimble parts are positioned out of the housing, and the spindle parts are positioned in the housing.

5. A micromanipulator according to the claim 1, wherein a pivotal fulcrum between the differential lever and the lower surface of the lid plate is set at a position which is divided to 10/11 : 1/11 of the distance between the axes of the pair of micrometer heads, in order that the magnification of displacement between the coarse adjustment and the fine adjustment is 10 to 1.

6. A micromanipulator according to claim 1, wherein said lid plate is made of a transparent material so that the internal mechansim can be seen therethrough.

7. A micromanipulator according to the claim 1, wherein said lid plate is made of a transparent material, and on the front surface or the back surface of said lid plate are described the distance between axes of the pair of micrometer heads, i.e., positions of each of fulcrums, point of application, and the position of oblique displacement of the differential lever.

8. A micromanipulator according to the claim 1, wherein the lid plate and the slider block are connected together with at least two points by way of bolts that serve as a fixing means, and each bolt is fitted with a sleeve that serves as a spacer.

9. A micromanipulator according to the claim 1, wherein rectangular guide blocks are fastened by way of screws to the inner sides of a pair of side plates, and a plurality of sliding steel balls are interposed between the inner sides of each of the guide blocks and both sides of the slider block.

* * * * *